US012798230B2

(12) United States Patent
Arkenljung

(10) Patent No.: US 12,798,230 B2
(45) Date of Patent: Nov. 17, 2026

(54) ROLL OF CLEANING FABRIC, AND METHODS THEREOF

(71) Applicant: BW Converting AB, Arlöv (SE)

(72) Inventor: Ulf Arkenljung, Malmö (SE)

(73) Assignee: BW Converting AB, Arlöv (SE)

( * ) Notice: Subject to any disclaimer, the term of this patent is extended or adjusted under 35 U.S.C. 154(b) by 0 days.

(21) Appl. No.: 18/702,212

(22) PCT Filed: Oct. 25, 2022

(86) PCT No.: PCT/EP2022/079836
§ 371 (c)(1),
(2) Date: Apr. 17, 2024

(87) PCT Pub. No.: WO2023/072964
PCT Pub. Date: May 4, 2023

(65) Prior Publication Data

US 2025/0010607 A1 Jan. 9, 2025

(30) Foreign Application Priority Data

Oct. 28, 2021 (SE) .................................... 2151319-7

(51) Int. Cl.
*B41F 35/00* (2006.01)
*B41F 35/04* (2006.01)

(52) U.S. Cl.
CPC ........ *B41F 35/04* (2013.01); *B41P 2235/246* (2013.01); *B41P 2235/50* (2013.01)

(58) Field of Classification Search
CPC .. B41F 35/04; B41P 2235/50; B41P 2235/246
See application file for complete search history.

(56) References Cited

U.S. PATENT DOCUMENTS

| | | | | |
|---|---|---|---|---|
| 3,536,643 | A | 10/1970 | Stryker et al. | |
| 5,340,495 | A | 8/1994 | Mulcahy et al. | |
| 5,368,157 | A | 11/1994 | Gasparrini et al. | |
| 5,657,693 | A | 8/1997 | Kumaki et al. | |
| 6,035,483 | A | 3/2000 | Gasparrini et al. | |
| 6,588,337 | B1 | 7/2003 | Kreckel et al. | |
| 7,219,605 | B2 | 5/2007 | Nishiyama et al. | |
| 2005/0250659 | A1 | 11/2005 | Howey et al. | |
| 2017/0043571 | A1 * | 2/2017 | Mietus | B41F 35/06 |
| 2021/0292687 | A1 * | 9/2021 | Arkenljung | C11D 3/32 |

FOREIGN PATENT DOCUMENTS

| | | | | | |
|---|---|---|---|---|---|
| CN | 104420088 | B | * | 1/2018 | D06B 1/02 |
| CN | 118873037 | A | * | 11/2024 | A46B 17/06 |
| DE | 202006015939 | U1 | * | 1/2007 | B08B 3/006 |
| DE | 202011106154 | U1 | | 10/2012 | |
| DE | 102011114460 | A1 | | 3/2013 | |
| EP | 0348609 | A2 | | 1/1990 | |

(Continued)

*Primary Examiner* — Christopher E Mahoney
*Assistant Examiner* — Marissa Ferguson-Samreth
(74) *Attorney, Agent, or Firm* — Thompson Coburn LLLP

(57) ABSTRACT

In a method for cleaning cylinders included in a printing system, a roll of cleaning fabric is used. The roll (12) has a bobbin (14) coated with a water repellent, and the cleaning fabric (13) is wound onto the bobbin (14). The cleaning fabric (13) is impregnated with a cleaning composition containing water in a concentration of between 5 and 50 wt %.

23 Claims, 7 Drawing Sheets

(56) References Cited

FOREIGN PATENT DOCUMENTS

| | | | | | |
|---|---|---|---|---|---|
| EP | 435269 | A1 | | 7/1991 | |
| EP | 0527315 | B1 | | 12/1995 | |
| EP | 878304 | A1 | | 11/1998 | |
| EP | 0692021 | B1 | * | 5/2002 | ............... C11D 3/43 |
| EP | 2064061 | B1 | | 8/2010 | |
| EP | 2735446 | A1 | | 5/2014 | |
| GB | 1365464 | A | | 9/1974 | |
| JP | 2004168528 | A | * | 6/2004 | |
| JP | 2014213494 | A | * | 11/2014 | |
| PL | 208149 | B1 | | 3/2011 | |
| WO | 2004050368 | A1 | | 6/2004 | |
| WO | 2004106067 | A1 | | 12/2004 | |
| WO | 2005113243 | A1 | | 12/2005 | |
| WO | 2005113244 | A1 | | 12/2005 | |
| WO | 2008143683 | A1 | | 11/2008 | |
| WO | WO-2012036242 | A1 | * | 3/2012 | .............. B41F 35/00 |
| WO | WO-2013045309 | A1 | * | 4/2013 | ............... B08B 1/04 |
| WO | 2018149890 | A1 | | 8/2018 | |
| WO | WO-2020035499 | A1 | * | 2/2020 | .............. B41F 35/00 |

* cited by examiner

ROLL OF CLEANING FABRIC, AND METHODS THEREOF

RELATED APPLICATION DATA

The following application in a national stage entry of WO 2023/072964 (PCT/EP2022/079836) having a international filing date of Oct. 25, 2022, which claims priority benefit to Swedish patent application serial no. SE 2151319-7, filed on Oct. 28, 2021, the disclosures of which are incorporated by reference herein.

TECHNICAL FIELD

The present invention relates to a roll of cleaning fabric configured to clean cylinders included in a printing system, a kit comprising a roll of cleaning fabric for cleaning cylinders of a printing system and a container, as well as methods relating thereto.

BACKGROUND

In order for printing cylinders of a printing system to fulfil a desired printing result, the cylinders must be cleaned on a regular basis. An example of a cleaning apparatus for a printing system is shown in U.S. Pat. No. 7,219,605B2. Several different cleaning methods are known, such as spraying a cleaning liquid onto the cylinders or cleaning the cylinders by hand using means of a cleaning fabric, which has been dipped into a cleaning liquid.

The cleaning fabric is often pre-impregnated with a cleaning composition configured to dissolve and remove ink residues from the printing cylinders. In addition, paper residues are prone to adhere to the surfaces of the printing cylinders. The adhered paper debris is difficult to dissolve by the cleaning composition. Hence the paper residues need to be removed from the cylinders before the cleaning process with a cleaning fabric and cleaning composition can begin. Therefore, it is common practice to apply water to the printing cylinders by means of spray bars or spray nozzles installed in the printing system. For instance, in US2005250659A1 (corresponding to WO2005113244A1) it is described how water can be sprayed onto cylinders in a printing system to remove dirt and paper residues.

However, the spray bars, nozzles and water tubes leading water to the nozzles are prone to clogging due to the hostile environment in the printing system. The surroundings in the printing system contain paper debris, ink residues and other contaminants, which easily clog the spray devices. Lime contained in the water used can also cause clogging.

Examples of a prior-art equipment trying to solve the issues of clogging pipes and nozzles in printing systems are shown in EP435269A1 and EP878304A1. Further background art is reflected for instance in U.S. Pat. No. 5,340, 495A, GB1365464A, WO2018149890A1, WO2020035499A1 and EP348609A2.

From the above it is understood that there is room for improvements regarding the issues with clogged nozzles and pipes in printing systems, etc.

SUMMARY

An object of the present invention is to provide a concept which is improved over prior art and which solves or at least mitigates the problems discussed above. This object is achieved by the technique set forth in the appended independent claims, preferred embodiments being defined in the related dependent claims.

In a first aspect, there is provided a roll of cleaning fabric for cleaning printing cylinders of a printing system. The roll comprises a bobbin coated with a water repellent coating, and a cleaning fabric wound onto the bobbin and impregnated with a cleaning composition. The cleaning composition comprises water in a concentration of between 5 and 50 wt %. This is an advantageous roll of cleaning fabric since the water repellent coating protects the bobbin of the roll from the water in the cleaning composition.

The cleaning composition may be a micro-emulsion and may comprise water in a concentration of between 20 to 40 wt %. In one embodiment, the cleaning composition further comprises a glycol ether, a polyethylene glycol (PEG) ester, preferably a polyethylene glycol fatty acid ester, an ethoxylated amine, an ethoxylated alcohol, or a combination thereof.

In another embodiment, the bobbin is made from a paper material, preferably cardboard. This is beneficial since paper material is degradable and thus environmentally friendly, cheap and abundant, and light in weight.

In a further embodiment, the bobbin is hollow and coated with the water repellent coating on both an external surface and an internal surface. A hollow bobbin is even more lightweight and coating of both the external and internal surfaces protects the bobbin as a whole.

In yet another embodiment, the internal surface of the bobbin is provided with internal means for rotationally locking it to a mounting shaft arranged in a washing unit configured to receive the hollow bobbin thereon. This prevents the roll from gliding on the mounting shaft during use. The internal locking means of the bobbin may be in the form of internal, longitudinal or axial projections configured to engage corresponding longitudinal grooves provided in the mounting shaft, or the internal locking means of the bobbin may be in the form of grooves configured to engage corresponding internal, longitudinal or axial projections provided on the mounting shaft.

In one embodiment, the roll is packed in a sealing bag, and preferably the roll is vacuum packed in such a bag. This prevents the cleaning composition from evaporating before use of the roll, e.g. during transport and/or storage. The vacuum packing also ensures an even distribution of the cleaning composition in the fabric of the roll.

In another embodiment, the water repellent coating comprises a combination of water, a polyethylene emulsion, preferably a high density polyethylene emulsion, and a styrene acrylic emulsion.

In a second aspect, there if provided a method of forming a roll of cleaning fabric for cleaning printing cylinders of a printing system. The method comprises the steps of applying a water repellent coating to a bobbin of the roll, and winding a cleaning fabric impregnated with a cleaning composition comprising water in a concentration of between 5 and 50 wt % around the bobbin to form the roll.

The method may further comprise a step of drying the bobbin coated with the water repellent coating. The method may further comprise packaging the roll in a sealing bag. Preferably, the sealing bag is sealed with heat sealing to obtain vacuum in the sealing bag.

In a third aspect, there is provided a method of cleaning printing cylinders of a printing system using the roll of cleaning fabric for cleaning printing cylinders of a printing system. The method comprises the steps of placing the roll in a container comprising a slit extending along the container, feeding a cleaning fabric of the roll through the slit of the container, mounting the container enclosing the roll in a washing unit, and cleaning at least one printing cylinder of the printing system with the washing unit. The method may further comprise a step of removing the roll from a sealing bag before placing the roll in the container.

In a fourth aspect, there is provided a kit comprising a roll of cleaning fabric for cleaning printing cylinders of a printing system, and a container. The cleaning fabric is impregnated with a cleaning composition comprising water in a concentration of between 5 and 50 wt % and is wound onto a bobbin of the roll, and the container has a slit that extends along the container and that is configured to receive the cleaning fabric of the roll.

In one embodiment, the container has mounting openings for mounting the roll and container in a washing unit. The bobbin may either be made from a paper material coated with a water repellent coating, or a plastic or metallic material.

The present invention is-inter alia-based on the idea that the step of spraying the printing cylinders with water can be omitted, if a core of a roll for cleaning the printing cylinders is coated with a waterproof coating, and a cleaning fabric of the roll wound around the core is impregnated with a cleaning composition being a micro-emulsion comprising water. The water in the micro-emulsion will dissolve paper debris from the printing cylinders such that water spraying can be omitted, and the waterproof coating protects the core from degrading, even when made of paper based materials.

Other objectives, features and advantages of the present invention will appear from the following detailed disclosure, and from the attached claims, as well as from the drawings. It is noted that the invention relates to all possible combinations of features.

BRIEF DESCRIPTION OF THE DRAWINGS

Embodiments of the invention will be described in the following; references being made to the appended diagrammatic drawings, which illustrate non-limiting examples of how the inventive concept can be reduced into practice.

DETAILED DESCRIPTION

Figure 1:
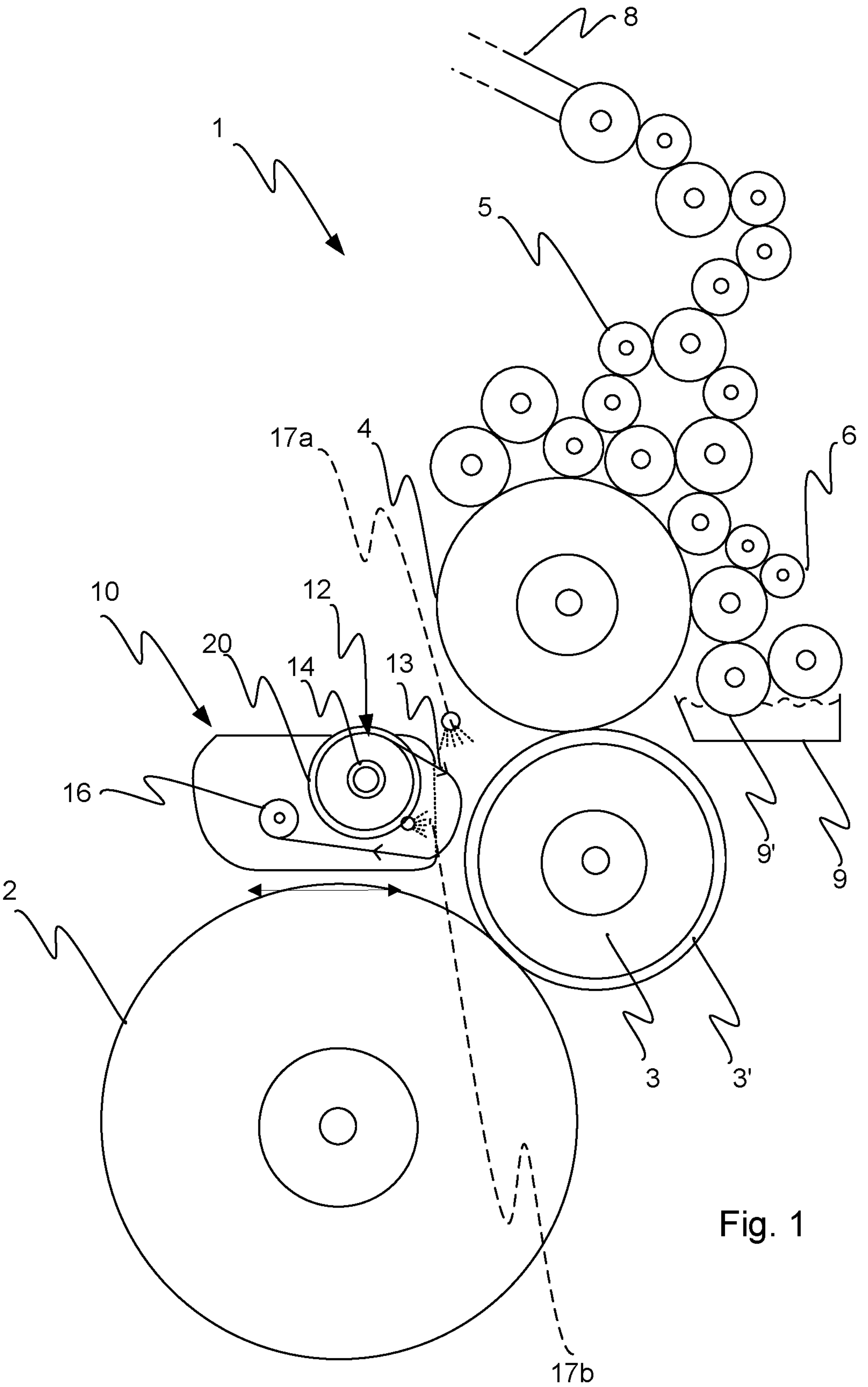
FIG. 1 shows a cross section of a general printing system with a set up of cylinders and a washing unit with a roll of cleaning fabric and a spray nozzle bar.

With reference to FIG. 1, a general printing unit or system 1 with a number of printing cylinders and rollers 2, 3, 4, 5, 6 is illustrated. The printing system 1 described herein has an impression cylinder 2 (the largest printing cylinder, down to the left in FIG. 1), a blanket cylinder 3 (the medium sized cylinder next to the impression cylinder) which has a blanket 3', herein referred to as a rubber sheet 3', and a plate cylinder 4 (the medium sized cylinder next to the blanket cylinder). The blanket 3' is commonly approximately 2 mm thick. The printing system 1 further has a number of inking rollers 5 (small rollers not being damping rollers) and a number of damping rollers 6 (the five small sized rollers down to the right).

The set of inking rollers 5 is associated with an ink source 8 which provides the inking rollers 5 with ink. The set of damping rollers 6 is associated with a damping source, in this case a water bath 9, which provides the damping rollers 6 with water. The printing system 1 further comprises a cleaning machine or washing unit 10 which houses a cleaning device or roll 12 with a cleaning fabric 13, also referred to as a cleaning cloth. The cleaning fabric 13 is configured to clean cylinders and rollers included in the printing system.

Figure 2A:
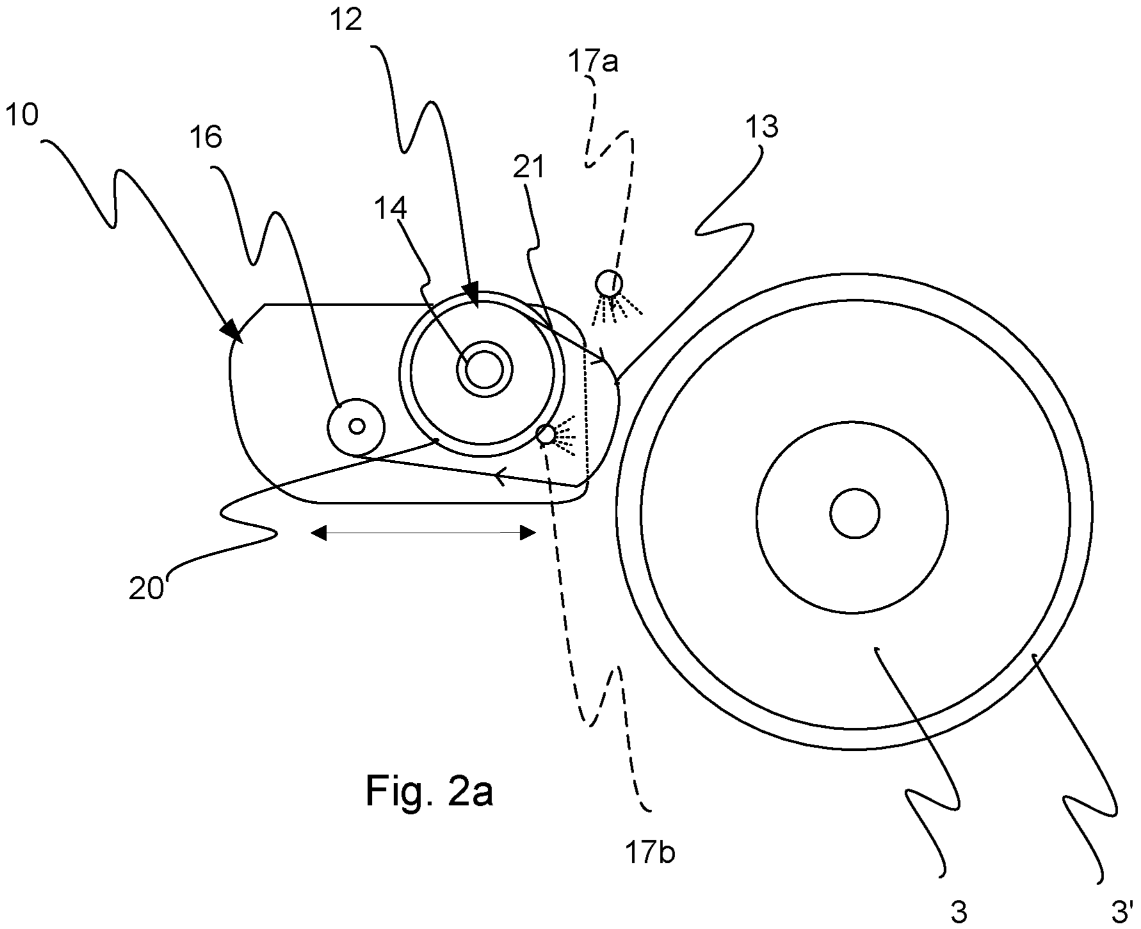
FIG. 2*a* shows an enlarged portion of FIG. 1.

In FIGS. 1 and 2*a*, spray devices 17*a*, 17*b* used in current cleaning systems are shown. The spray devices 17*a*, 17*b* are shown in dashed lines to indicate that they belong to a currently used cleaning system. The washing unit 10 comprises a spray device 17*a*, 17*b* herein also referred to as a spray nozzle arrangement having spray nozzle set ups either in the position 17*a* or in the position 17*b*. The spray device 17*a*, 17*b* is arranged and configured to spray the rubber sheet 3' of the blanket cylinder 3 with water to remove paper residues and other water soluble debris adhered to the rubber sheet 3' on the printing cylinder 3. As shown in FIGS. 1 and 2*a*, the spray device 17*a*, 17*b* used in current cleaning systems may be arranged inside the washing unit 10 and facing the blanket cylinder 3, or it may be arranged adjacent to the washing unit 10 facing the blanket cylinder 3.

FIG. 2*a* shows the washing unit 10 of the printing system 1 shown in FIG. 1. The washing unit 10 comprises the cleaning roll 12, which includes a bobbin or core 14. The cleaning fabric 13 has been wrapped or wound around the core 14. The bobbin 14 is preferably hollow. The bobbin 14 is preferably made from a paper material, such as cardboard. However, the core 14 may be made from any suitable material, for example plastic, another paper or fibre based material or metal. Further, the bobbin 14 may be solid instead of hollow. It can also have different cross sections, the design described herein has a circular cross section.

In FIGS. 1 and 2*a*, the roll 12 is placed inside a container 20 having a slit 21 (shown in FIG. 2*a*) through which the printing system cylinder cleaning fabric 13 is fed. The washing unit 10 of FIGS. 1 and 2*a* further comprises a collecting roller 16, onto which used cleaning fabric 13 is collected after cleaning.

Figure 2B:
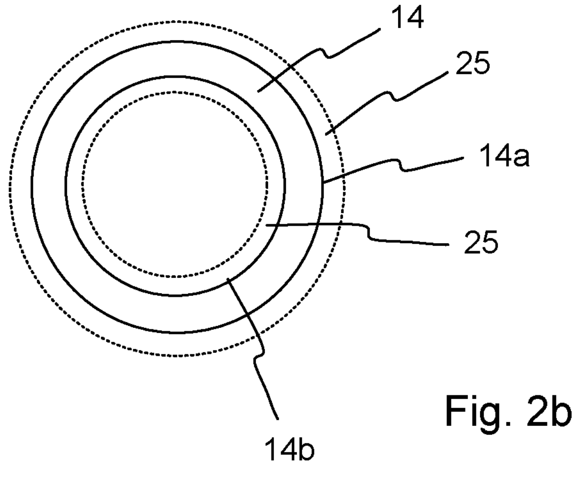
FIG. 2*b* shows a cross-section of a core of the roll of cleaning fabric.

Preferably, as shown in FIG. 2*b*, the core 14 is coated internally and externally on an external surface 14*a* and internal surface 14*b* with a waterproof coating 25, also referred to as a water resistant coating or a water repellent coating herein. Since the bobbin 14 is coated with the water resistant coating 25, it is not sensitive to water, even if the bobbin 14 is made of a paper or fibre based material, which would otherwise be damaged or degraded when coming into contact with water. If the bobbin 14 is made of plastic, the waterproof coating 25 can be excluded. Alternatively, if the bobbin 14 is solid, the bobbin 14 is coated with the waterproof coating 25 on the external surface 14*a*.

The waterproof coating 25 may comprise a styrene-acrylic emulsion, a polyethylene emulsion, and water. An example of a waterproof coating 25 is shown in Table 1 below.

TABLE 1 an exemplary composition of a waterproof coating

| Raw Material | Percent by Mass (Wt %) |
|---|---|
| Styrene acrylic emulsion | 60-80 |
| High density polyethylene emulsion | 10-30 |
| Water | 1-10 |

Styrene Acrylic Emulsion

A styrene-acrylic emulsion is a type of polymer emulsion that introduces styrene into acrylate polymers. As a kind of coating matrix resin, the styrene-acrylic emulsion has great advantages such as good adhesion, good water resistance, good heat resistance, and good aging resistance.

Styrene-acrylic emulsion polymers are based on a group of chemicals known as acrylates, which includes acrylic acid and its esters, such as the monomers methyl acrylate, butyl acrylate, ethyl acrylate, and 2-ethylhexyl acrylate. All of these acrylic monomers are highly reactive chemicals, which means they readily combine with themselves or other monomers to form commercially important polymers. Emulsion polymerization involves acrylic-based monomers combining with styrene to form a styrene-acrylic emulsion polymer. Hence, a styrene-acrylic emulsion is obtained by emulsion copolymerization of styrene and acrylate monomers. The versatility of this class of polymers owes much to the wide-ranging family of acrylic monomers, which, when combined with styrene, can build random copolymers with specific glass transition temperatures (Tg).

Styrene-acrylic polymers provide hydrophobic characteristics, which means they have superior water resistance and moisture vapor transmission rate (MVTR) when compared to all-acrylic polymers. Also, styrene itself is a hydrophobic monomer, making it possible to produce styrene-acrylic polymers with low particle sizes, which is preferable for certain applications, such as primers for the construction industry or binders for paper coatings.

Another advantageous property of styrene-acrylic polymers is their high glass transition temperature. As a result, they tend to be durable and exhibit good abrasion resistance and good mechanical properties. Other properties of styrene-acrylic emulsion polymers include good weatherability and good stain resistance, broad tensile/elongation balance, the ability to crosslink, high pigment-binding capacity, ideal gloss, film strength, and resistance to removal by detergents and good adhesion to common substrates.

Polyethylene Emulsion

A polyethylene emulsion is an emulsion of polyethylene in water. Different additives, like e.g. other waxes can also be comprised in the emulsion. The emulsion may be a high density polyethylene emulsion, a medium density polyethylene emulsion, or a low density polyethylene emulsion. The polyethylene emulsion may further be non-ionic.

There are several known methods in the art to form polyethylene emulsions, such as e.g. may be prepared by introducing molten oxidized polyethylene wax containing emulsifiers and other additives into water at a temperature close to the boiling point. Such methods are disclosed in for instance U.S. Pat. No. 3,536,643A and PL208149B1.

Figure 3:
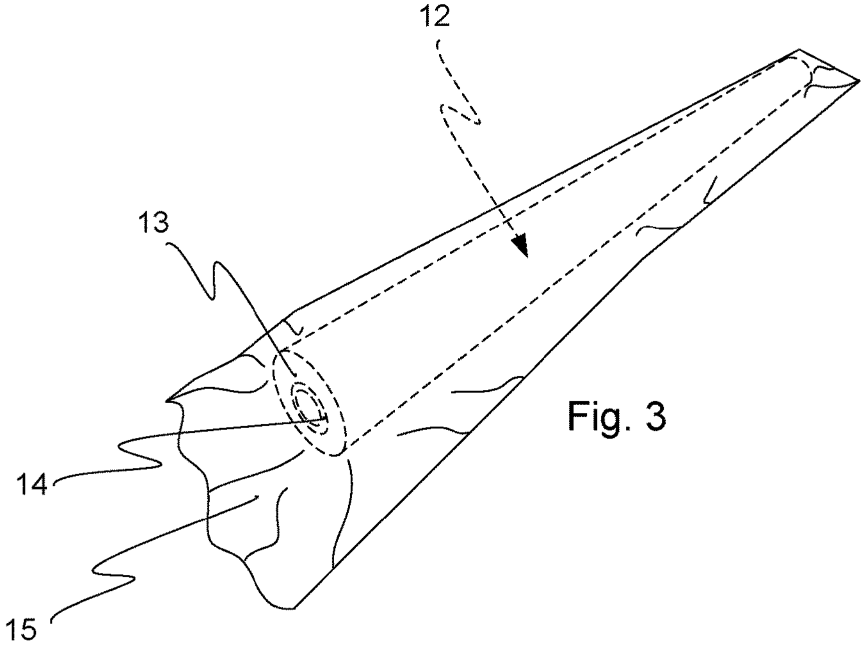
FIG. 3 illustrates the roll in perspective and vacuum-packed in a sealing bag.

FIG. 3 illustrates the roll 12 in perspective view and vacuum-packed in a sealing bag 15, which preferably is made from plastics material. As described above, the roll 12 comprises the core 14 and the cleaning fabric 13 wrapped or wound around the core 14. The core 14 is hollow and has been coated on its external and internal surfaces 14*a*, 14*b* with the waterproof coating 25 (shown in FIG. 2*b*).

Further, the cleaning fabric 13 has been soaked or impregnated with a cleaning liquid, also referred to herein as a cleaning composition. The cleaning composition is preferably an emulsion, and more preferred the cleaning composition is a micro-emulsion. The cleaning composition comprises 5 to 50 wt % of water, more preferably 20 to 40 wt % of water.

In some cases, where a relatively high amount of water is needed in the cleaning composition, it is favourable to encapsulate the water to avoid evaporation. A relatively high amount of water may be needed in cases where the cylinders have a large build-up of paper debris or the like to be removed. To enable efficient cleaning, a relatively higher weight percentage of water may thus be needed in the cleaning composition. Higher amounts of water in the cleaning composition place a higher demand on the water repellent coating on the core. In general, relatively high water concentrations are efficient in order to clean the cylinders, but too high water concentrations may decrease the ink removal effect.

For instance, the micro-emulsion cleaning composition comprises:

a) 30 to 70 wt % of a polyethylene glycol (PEG) ester (such as a polyethylene glycol fatty acid ester);
b) 5 to 40 wt % of a glycol ether;
c) 5 to 50 wt % of water; and
d) 1 to 20 wt % of ethoxylated amines and/or ethoxylated alcohols.

An exemplary micro-emulsion cleaning composition is shown in Table 2.

TABLE 2 an exemplary micro-emulsion cleaning composition.

| Raw Material | Percent by Mass (Wt %) |
|---|---|
| Polyethylene glycol fatty acid ester | 40-60 |
| Glycol ether | 10-30 |
| Water | 20-40 |
| Ethoxylated amines | 1-10 |
| Ethoxylated alcohols | 1-10 |

Polyethylene Glycol (PEG) Ester

Polyethylene glycols (PEGs) are a large group of synthetic polyethers available in a range of molecular weights, with multifunctional properties.

PEG esters are a group of surfactants, and are formed by reacting a polyethylene glycol with a fatty acid. The polyethylene glycol provides a hydrophilic part of the surfactant and the fatty acid provides the hydrophobic (lipophilic) portion. By varying the molecular weight of the PEG and the fatty acid, surfactants covering a wide range of hydrophilic-lipophilic balance (HLB) values can be produced. Typically, those PEG esters with an HLB below 13 are oil soluble and water dispersible while those having an HLB above 13 are generally water soluble.

PEG esters have a wide range of advantageous properties. PEG esters, particularly PEG oleates and stearates, are excellent emulsifiers, better than for instance alcohol ethoxylates or nonyl phenol ethoxylates. They have a low foaming tendency, good wetting/dispersing properties and low toxicity. They are for instance widely used in cosmetics and toiletries as well as solvent cleaners and emulsifiable degreasers. PEG esters are also readily biodegradable.

Glycol Ethers

Glycol ethers are a group of compounds based on alkyl ethers of ethylene glycol or propylene glycol. The glycol ether solvents usually have a relatively high boiling point, and have advantageous solvent properties of lower-molecular weight ethers and alcohols.

Examples of glycol ethers which may be used in the cleaning composition are for instance ethylene glycol monomethyl ether, ethylene glycol monoethyl ether, ethylene glycol monoisopropyl ether, ethylene glycol monobutyl ether, ethylene glycol monophenyl ether, ethylene glycol monobenzyl ether, propylene glycol methyl ether, diethylene glycol monomethyl ether, diethylene glycol monoethyl ether, diethylene glycol mono-n-butyl ether, dipropyleneglycol methyl ether, phenoxyethanol, pentaethylene glycol monododecyl ether, alkylene polyglycol ether or a combination thereof.

Ethoxylated Amines

Amine ethoxylates are non-ionic surfactants resulting from the reaction of alkylamines with ethylene oxide. The amine ethoxylate may be formed from ethoxylation of e.g. a tallow amine, coco amine, stearyl amine, oleyl amine or a combination thereof.

Ethoxylated Alcohols

Industrial ethoxylation is primarily performed upon fatty alcohols in order to generate fatty alcohol ethoxylates (FAE's), which are a common form of non-ionic surfactant. Such alcohols may be obtained by the hydrogenation of fatty acids from seed oils, or by hydroformylation in the Shell higher olefin process. The reaction proceeds by blowing ethylene oxide through the alcohol at 180° C. under 1-2 bar of pressure, with potassium hydroxide (KOH) serving as a catalyst. The process is highly exothermic (ΔH −92 KJ/mol of ethylene oxide reacted). The starting materials are usually primary alcohols.

$$ROH + {}_n(C_2H_4O) \longrightarrow R(OC_2H_4)_nOH$$

The ethoxylated alcohol may be for instance octyl phenol ethoxylate, Polyoxyethylene (20) sorbitan monooleate (known as for instance Tween 80 or polysorbate 80), poloxamers, octaethylene glycol monododecyl ether or a combination thereof.

Further, again with reference to FIG. 3, the cleaning roll 12 is pre-packed and stored until it is to be used in the cleaning process. The cleaning roll 12 is vacuum packed until the bag 15 is broken before a cleaning process starts. The process of vacuum packing is commonly performed by heat sealing. A multi-layer plastic film of the wrapping prevents the cleaning composition from evaporating. Further, the vacuum packing of the roll 12 prevents the cleaning composition to migrate or diffuse through the cleaning fabric 13. Unwanted diffusion in the cleaning fabric 13 causes an uneven distribution of the cleaning composition and hence a poor and uneven cleaning result.

Figure 4:
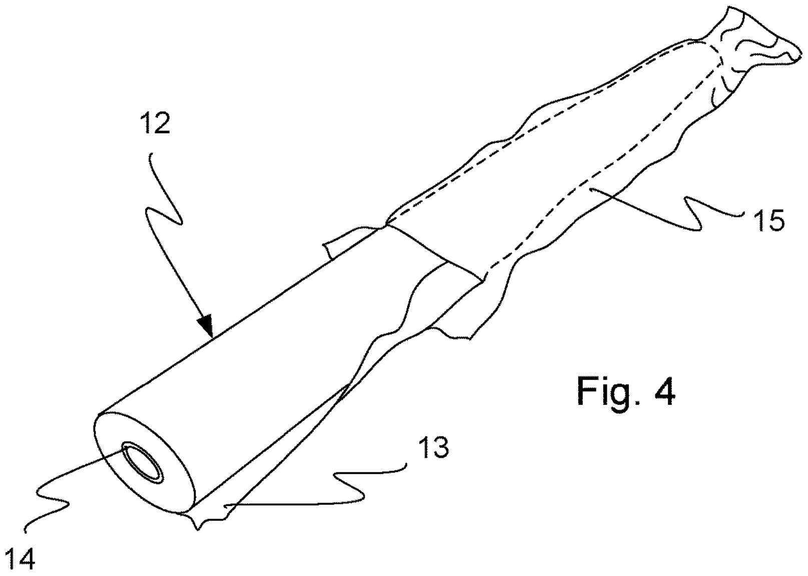
FIG. 4 illustrates the roll shown in FIG. 3 with the sealing bag partially removed.

FIG. 4 illustrates the roll 12 shown in FIG. 3 with the sealing bag 15 partially removed. Preferably, the bag 15 is tubular and built up by a multi-layer plastic film. A suitable plastic film for this purpose is a three-layer film. The three-layer film may for example be based on a first layer of polyethylene (PE) providing a fluid barrier, a second mid layer of polyamide (PA) providing strength and a third layer of polyethylene (PE) providing a fluid barrier and a sealing layer. This three-layer plastics film has proven to be favourable in practical tests. The thickness of the sealing film is designed in such a way that it is easy to remove from the roll 12, as is shown in FIG. 4. Preferably, the sealing bag 15 is vacuum packed by heat sealing the bag 15.

Pre-packed cleaning rolls of basic structure are known in the art per se and are described for instance in the publication U.S. Pat. No. 5,368,157A.

According to the present disclosure, the cleaning fabric 13 is a liquid or solvent absorbable material, such as a non-woven material, and is adapted to be impregnated or soaked with the cleaning composition of the present disclosure before starting a cleaning process. Preferably, the cleaning fabric 13 is impregnated or soaked with the cleaning liquid of the present disclosure before being packed and stored or transported, i.e. it can be impregnated or soaked long before it is to be used in a cleaning process.

Figure 5:
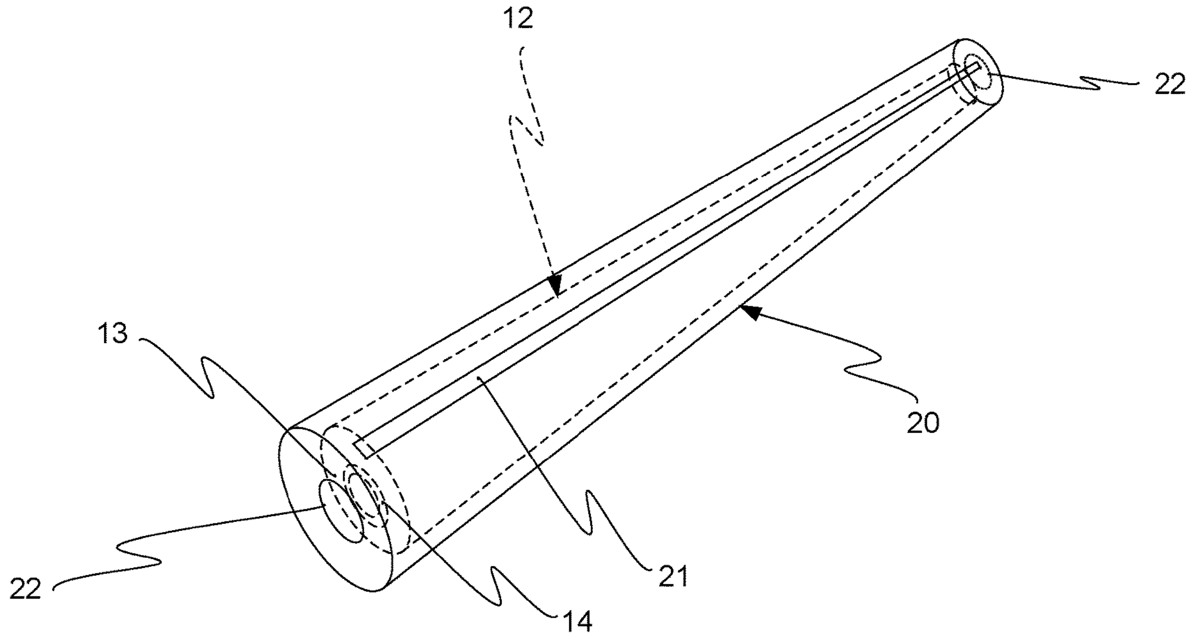
FIG. 5 shows the roll placed inside a container.

FIG. 5 shows the container 20, which is configured to hold and enclose the roll 12 when the roll 12 has been removed from the sealing bag 15 (shown in FIGS. 3 and 4). The container 20 comprises a longitudinal slit 21 having a width being at least as wide as a width of the cleaning fabric 13 wound around the core 14. The container 20 has a substantially tubular or cylindrical shape. However, the container 20 may have a rectangular shape or any other shape suitable for encasing the roll 12.

The container 20 shown in FIG. 5 further comprises mounting openings in the form of an aperture 22 on each side end to provide access to the core 14 of the roll 12. The apertures 22 are aligned with the core 14 of the roll 12 when the roll 12 is placed inside the container 20. Since the container 20 seals the roll 12, the cleaning composition impregnated in the cleaning fabric 13 is prevented from evaporating during cleaning.

Figure 6:
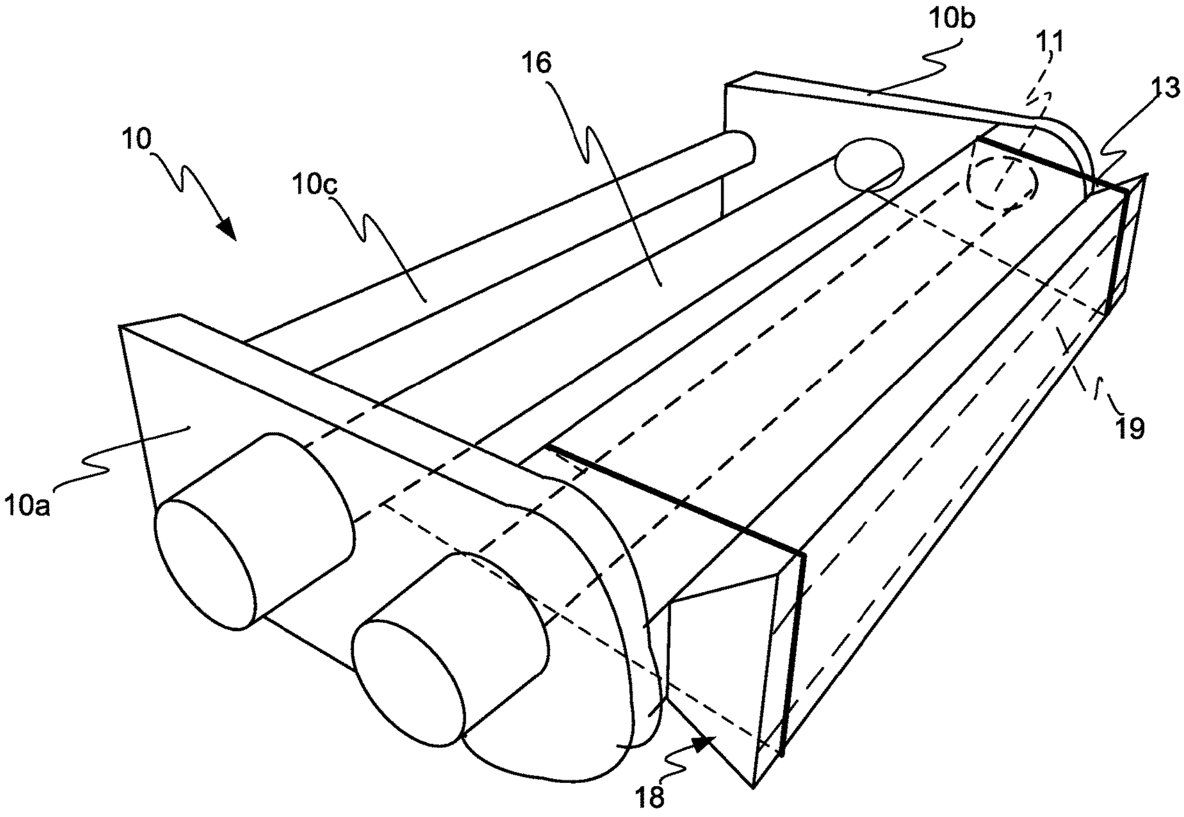
FIG. 6 shows a washing unit.

FIG. 6 shows the washing unit 10 included in the printing system of FIG. 1 separately and in more detail. The washing unit 10 includes two spaced side members **10*a* and 10*b* interconnected by a transverse member 10*c*. These members 10*a-c* form the frame of the washing unit 10**.

Furthermore, the washing unit 10 includes mounting means in the shape of a transverse mounting shaft 11 configured to support the core 14 of the roll 12 of cleaning fabric 13 (shown in bold in FIG. 6). Hence, the shaft 11 and the roll 12 supported thereon are rotatable together. For simplifying reasons, the roll/core assembly 12/14 and the container 20 are not shown in FIG. 6. During use, the container 20 enclosing the roll 12 is mounted onto the shaft 11 of the washing unit 10 (not shown).

Optionally, the internal surface **14*b* of the bobbin 14 is provided with internal means for rotationally locking it to the mounting means 11 in the washing unit 10. Preferably, the internal means of the bobbin 14 are in the form of internal, longitudinal or axial projections for cooperation with corresponding longitudinal grooves provided in the mounting means 11. The purpose of this arrangement is to keep the mounting means 11 and the bobbin 14** from relative rotatable movements during operation.

At the free transverse end portion of the washing unit 10, there is a front pad 18 configured to press the cleaning fabric

13 against a cylinder to be cleaned. At its front surface, the pad 18 has a transverse element 19 of elastic material, preferably rubber, which serves to press the cleaning fabric 13 against the cylinder to be cleaned with a suitable pressure. The elongate elastic element 19 protrudes somewhat from the surface of the pad 18 where it is fastened.

The washing unit 10 also includes the transverse return roller or collecting roller 16 around which used cleaning fabric 13 is wrapped after been in cleaning contact with a cylinder. In this way, used cleaning fabric 13 can easily be collected and handled after a cleaning process. The shaft 11 and the collecting roller 16 are spaced apart and parallel. The collecting roller 16 is also referred to as a take-up roller since the free end of the cleaning fabric 13 is fastened to this roller before the cleaning process is initiated.

In operation, the collecting roller 16 and the shaft 11 are rotated—preferably stepwise—so that fresh portions of the cleaning fabric 13 are applied to the rotating cylinder to be cleaned. This rotational movement of the cleaning fabric 13 is illustrated diagrammatically by arrows in FIG. 1. In the embodiment described herein, the collecting roller 16 is rotationally driven so that the cleaning cloth 13 is rolled off from the roll 12 supported by the rotatable shaft 11 which may have means for preventing rotation in the opposite direction (not shown).

Printing and Cleaning Process

The printing work and cleaning of the printing system 1 will now be explained in more detail. With reference to FIG. 1, when the printing system 1 is performing printing work, water is transported towards the cylinders via the damping rollers 6 which collect water from the damping source 9. The water thus arrives and is present at the non-pressured surfaces occurring between the cylinders 2, 3, 4. Ink is then transported by means of the ink rollers 5, which collect ink from the ink source 8, towards the cylinders 3, 4, 5.

The print is then transferred to the blanket cylinder 3 and the material, e.g. paper. The material, e.g. paper, which is to receive the print, is arranged between the rubber sheet 3' on the blanket cylinder 3 and the impression cylinder 2. This is where the printing work is conducted and the print is transferred from the rubber sheet 3' to the material. The set up of the cylinders and rollers shown and described herein is only an example of a set up of a printing system.

Depending on type and use, the printing system 1 needs to be cleaned more or less often in order to maintain a sufficient printing quality. Commonly in prior-art printing systems, the cleaning process starts by spraying a liquid, most often water, which dissolves cellulose in the form of paper debris and other water soluble impurities which have adhered to the printing cylinders. Once the water soluble contaminants such as paper residues and the like have been removed, the washing unit 10 in prior-art printing systems can perform the cleaning process.

Hence, cleaning processes known in the art involve two separate steps, a water washing step and an ink removal step. The first water washing step, where water is sprayed onto the blanket cylinder, can be time consuming and inefficient. Moreover, the spray devices and water tubes leading water to the spray device clog easily. Clogging in the spray devices and the tubes supplying the spray devices with water occurs due to contamination by paper residues, lime in the water, ink residues and other debris. These contaminating particles penetrate the spray openings of the devices and may also clog the internal cavities of the water tubes.

According to the present disclosure when cleaning the printing system 1, there is no need for a pre-washing step of spraying the blanket cylinder 3 with water with a spray device 17*a*, 17*b* to remove paper residues and other water soluble debris, since paper residues are dissolved by the cleaning composition impregnated in the cleaning fabric 13. The cleaning composition of the present disclosure is an emulsion, preferably a micro-emulsion, comprising between 5 to 50 wt % of water, such as 10 to 45 wt % of water, preferably 20 to 40 wt % of water. In certain circumstances fairly low water concentrations are favourable, such as 5-20 wt %. In other circumstances, higher water concentrations can be applied, such as about 30 wt % or up towards 50 wt %. High water concentrations in this latter range are efficient in order to clean the cylinders, but too high water concentrations may decrease the ink removal effect. The water present in the cleaning composition will dissolve cellulosic fibres and other water soluble debris, for instance calcium carbonate, from the printing cylinders 2, 3, 4, 5. The water spray step is thus no longer needed, meaning that the spray device 17*a*, 17*b* can be omitted.

The water in the micro-emulsion cleaning composition aims to dissolve cellulosic paper debris which is water soluble. However, water comprised in the cleaning composition can in certain environments, such as in a printing system, evaporate. In such case water is no longer present in the cleaning composition, and the micro-emulsion will decrease its ability to dissolve water soluble impurities.

Therefore, the sealing bag 15 wrapped around the roll 12 during storage and transportation prevents evaporation of the cleaning liquid before the roll 12 is installed in the printing system. Before the cleaning process begins, the cleaning roll 12 is taken out of its package or bag 15, as shown in FIG. 4. The roll 12 is then placed in the container 20. Once the roll 12 is inserted in the container 20, encasing the roll 12, the cleaning composition is prevented from evaporation.

The container 20 containing the roll 12 is then arranged on the mounting means 11 the washing unit 10 in the printing system 1. Hence, the container 20 prevents evaporation of the cleaning composition during cleaning when the roll 12 has been removed from the bag 15 and inserted in the washing unit 10. The cleaning fabric 13 is threaded through the slit 21 of the container 20, placed over a pad member 18 of the washing unit 10 and secured to the collecting roller 16 in the washing unit 10. In this way, the container 20 safely holds the roll 12 during cleaning, protecting the roll 12 and preventing evaporation during use. The container 20 and the roll 12 are easy to assemble in the washing unit 10 due to the openings on the side ends of the container 20. In addition, the container 20 can be reused once the roll 12 is empty of cleaning fabric 13 and a new roll 12 has to be installed.

The washing unit 10 is then moved from an idle position, in which the cleaning fabric 13 is not in contact with the rubber sheet 3' of the cylinder 3, to an active position where the pad member 18 covered by the cleaning fabric 13 is in contact with the rubber sheet 3' of the cylinder 3. The washing unit 10 may also be brought into contact with other cylinders of the printing system, such as the impression cylinder 2. The cylinders 2, 3, 4, 5, 6 are rotated in the opposite direction of that when using the printing system for printing. The cleaning composition will thus be transferred from the cleaning fabric 13 onto the rubber sheet 3' of the cylinder 3 and further onto the remaining cylinders 2, 4, 5, 6 of the printing system 1.

Once the cleaning process has finished, the printing system 1 will rotate the cylinders 2, 3, 4, 5 and damping rollers 6 in the printing direction. This is the opposite direction of that used during the washing procedure. The damping rollers 6 will transfer water from the water bath 9 to the printing cylinders 2, 3, 4, 5 and the cleaning composition which has been used to clean the printing cylinders 2, 3, 4, 5 will be diluted and eventually removed from the printing system 1.

The pre-packed roll 12 comprising the cleaning composition of the present disclosure can be used in already functioning printing systems 1 which uses a washing unit 10 as described and which has a spray device 17*a*, 17*b* installed. The spray device 17*a*, 17*b* can simply be switched off or closed, and the new pre-packed roll 12 can be installed on the mounting means 11 will replace the spray step of the washing process.

A method 700 for manufacturing the roll 12, comprising the core 14 coated with a waterproof or water repellent coating 25 and the cleaning fabric 13 pre-impregnated with a cleaning composition comprising water, will now be described with reference to FIG. 7.

The method 700 comprises the steps of optionally providing 710 a bobbin or core 14, preferably made from a paper material such as cardboard. The core 14 is then coated 720 with a water resistant or waterproof coating 25, such that the coating 25 covers the external and internal surfaces 14*a*, 14*b* of the core 14, to provide a water resistant core 14. The coating 720 may for instance be conducted by dipping the core 14 into a bath with the waterproof coating 25 or by spraying the internal and external surface of the core 14 with said waterproof coating 25. Preferably, the method 700 then comprises an optional step of drying 730 the coated water resistant core 14.

Then, the cleaning fabric 13 impregnated with a cleaning composition is wrapped or wound 740 around the core 14 coated with the waterproof coating 25, thereby forming the roll 12 of cleaning fabric 13. Further, the cleaning fabric 13 can be impregnated or soaked either before or after being wrapped around the core 14. It is appreciated that any cleaning composition comprising water known in the art can be used as the cleaning composition.

Subsequently, the method 700 may comprise a step of packaging 750 the roll 12 in a sealing bag 15, preferably vacuum packing the roll 12 in said sealing bag 15 and/or sealing the bag 15 using heat sealing.

Figure 8:
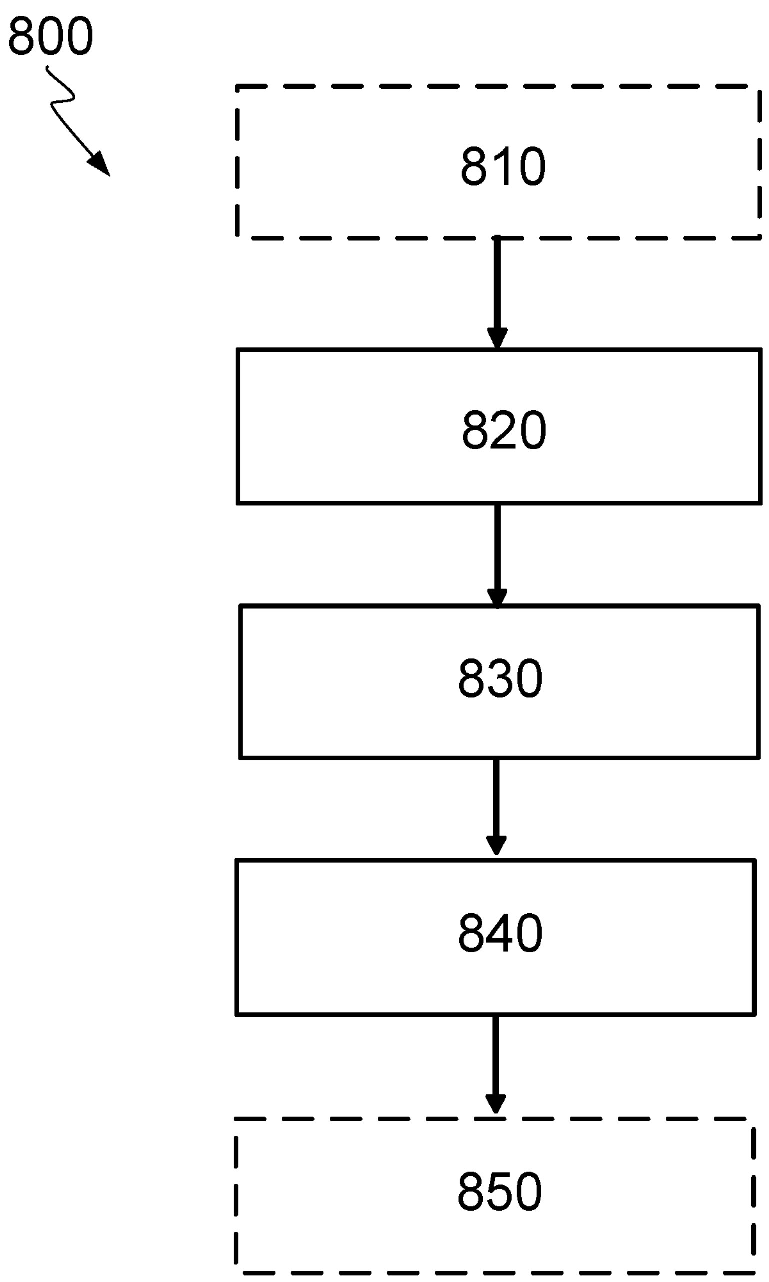
FIG. 8 shows a flow schedule of a method for cleaning printing cylinders in a printing system using a roll of cleaning fabric placed in said container.

FIG. 8 shows a flow schedule for a method 800 of cleaning printing cylinders of a printing system using the roll 12 described herein. The method 800 firstly comprises a step of placing 820 the roll 12 in a container 20 comprising a slit 21 extending along the container 20.

Secondly, the method 800 comprises threading or feeding 830 a cleaning fabric 13 of the roll 12 through the slit 21 of the container 20 and mounting 840 the container 20 enclosing the roll 12 in a washing unit 10. Preferably, the mounting 840 is conducted by arranging the container encasing the roll 12 on a shaft 11 in the washing unit 10, by threading the shaft 11 through the mounting apertures of the container 20 and through the core 14. Then, the method 800 comprises cleaning 850 the printing cylinders 2, 3, 4, 5, 6 of the printing system 1 using the washing unit 10.

The method 800 may optionally comprise a step of removing 810 the roll 12 from a sealing bag 15 before placing 820 the roll 12 in the container.

Figure 7:
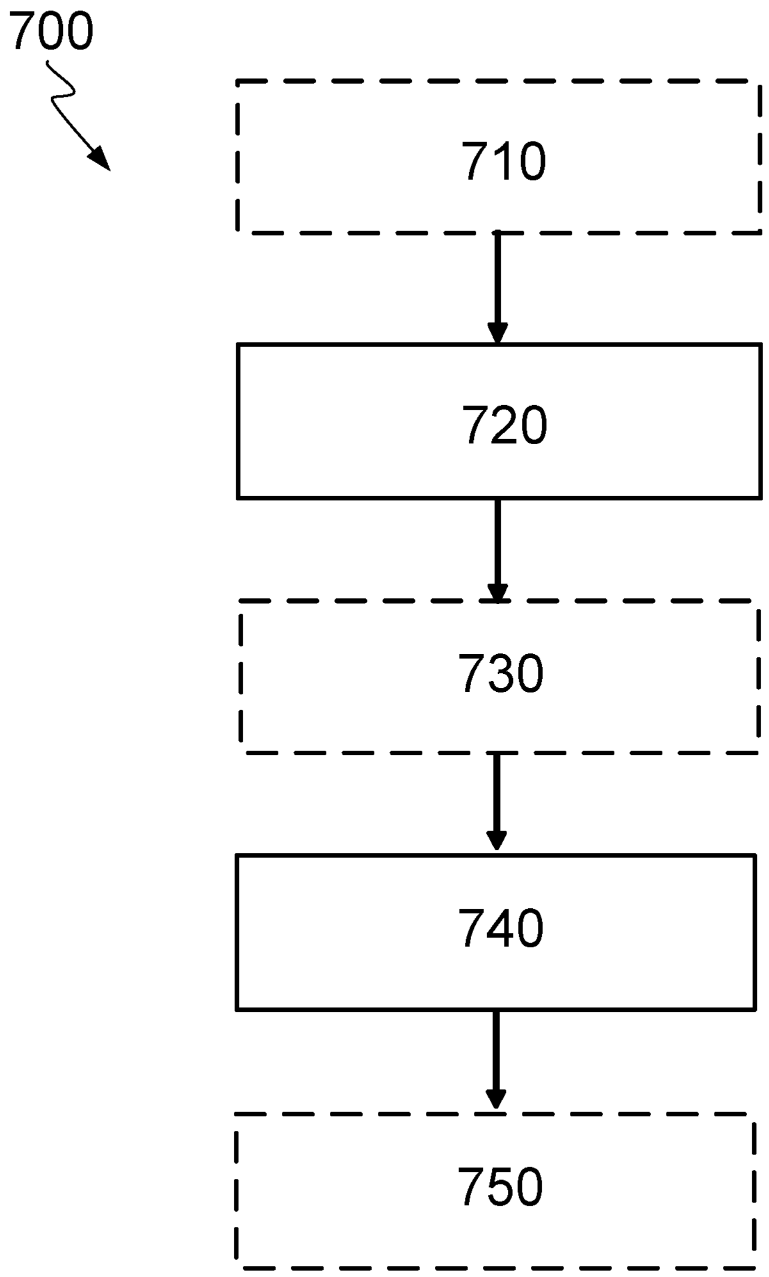
FIG. 7 shows a flow schedule of a method of forming said roll.

In FIGS. 7 and 8, optional method steps are indicated by dashed lines.

The concept described herein is further advantageous in that it enables sale of a kit comprising a roll 12 of cleaning fabric 13 for cleaning printing cylinders of a printing system 1, and a container 20 in which the cleaning fabric 13 is impregnated with a cleaning composition being a micro-emulsion comprising water and is wound around a bobbin 14 of the roll 12. The container 20 has a slit 21 extending along the container 20 configured to receive the cleaning fabric 13. Thus, the container 20 can be reused many times when the roll 12 is exchanged. Therefore, the consumer need not purchase several containers 20 but simply needs to refill the roll 12 once it is finished. The roll 12 may be made of plastic or paper. When made of plastic, no water resistant coating is necessary for the bobbin 14 since plastic is not sensitive to contact with water.

Generally, all terms used in the appended claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

As used herein, the term "comprising" and variations of this term are not intended to exclude other additives, components, integers or steps.

It is appreciated that the present concept is not limited to the embodiments described herein, and many modifications are feasible within the scope of the appended claims.

The invention claimed is:

1. A roll of cleaning fabric configured to clean cylinders included in a printing system, the roll comprising:

a bobbin coated with a water repellent coating; and a cleaning fabric wound onto the bobbin, the cleaning fabric being impregnated with a cleaning composition, wherein the cleaning composition comprises water in a concentration lower than 40 wt %, and wherein the cleaning composition is a micro-emulsion.

2. The roll according to claim 1, wherein the cleaning composition comprises the water in the concentration of between 5 to 20 wt %.

3. The roll according to claim 2, wherein the cleaning composition further comprises a glycol ether, a polyethylene glycol (PEG) ester, a polyethylene glycol fatty acid ester, an ethoxylated amine, an ethoxylated alcohol, or a combination thereof.

4. The roll according to claim 1, wherein the bobbin is made from a paper material.

5. The roll according to claim 1, wherein the bobbin is hollow and coated with the water repellent coating on both an external surface and an internal surface.

6. The roll according to claim 1, wherein the roll is packed in a sealing bag.

7. The roll according to claim 1, wherein the water repellent coating comprises a combination of water, a polyethylene emulsion, a high density polyethylene emulsion, and a styrene acrylic emulsion.

8. A method of forming a roll according to claim 1, the method comprising the steps of:

applying a water repellent coating to the bobbin of the roll; and winding the cleaning fabric impregnated with the cleaning composition that comprises the water in the concentration of lower than 40 wt % around the bobbin to form the roll.

9. The method according to claim 8, further comprising packaging the roll in a sealing bag.

10. The method according to claim 9 wherein the step of packaging the roll in the sealing bag comprises sealing the sealing bag with heat sealing to obtain vacuum in the sealing bag.

11. A method of cleaning cylinders included in a printing system using the roll according to claim 1, the method comprising the steps of:

placing the roll in a container comprising a slit extending along the container;

feeding a cleaning fabric of the roll through the slit of the container;

mounting the container enclosing the roll in a washing unit; and cleaning at least one printing cylinder of the printing system with the washing unit.

12. The method according to claim 11, further comprising a step of removing the roll from a sealing bag before placing the roll in the container.

13. The roll according to claim 1, wherein the roll is vacuum packed in the sealing bag.

14. A kit comprising: (i) a roll of cleaning fabric configured to clean cylinders included in a printing system, and (ii) a container; wherein the cleaning fabric is impregnated with a cleaning composition comprising water in a concentration of between 5 and 50 wt % and is wound onto a bobbin of the roll, wherein the cleaning composition is a micro-emulsion; and the container has a slit that extends along the container, the container is configured to receive the cleaning fabric of the roll.

15. The kit according to claim 14, wherein the container further comprises mounting openings for mounting the roll and container in a washing unit.

16. The kit according to claim 14, wherein the bobbin is made from one of: (i) a paper material coated with a water repellent coating; (ii) a plastic material; and (iii) a metallic material.

17. The kit according to claim 14 wherein the slit is configured to allow feeding of the cleaning fabric through the slit when the roll and the container is mounted in a washing unit.

18. The kit according to claim 14 wherein the container encases the roll in a manner so as to prevent evaporation of the cleaning composition from the cleaning fabric when the container containing the roll is mounted in a washing unit.

19. The kit according to claim 14 wherein the container is reusable with a further roll of further cleaning fabric configured to clean cylinders included in the printing system, wherein the further cleaning fabric is impregnated with a cleaning composition comprising water in a concentration of lower than 40 wt% and is wound onto a bobbin of the roll, wherein the cleaning composition is a micro-emulsion.

20. The kit according to claim 14, wherein the cleaning composition comprises water in a concentration of lower than 40 wt %.

21. The kit according to claim 14, wherein the cleaning composition comprises water in a concentration of between 5 and 20 wt %.

22. The kit of according to claim 14, wherein the cleaning fabric is wound around the bobbin with the bobbin disposed in an interior of the container with a portion of the cleaning fabric being threaded through the slit and out of the container when the container with the roll is mounted in a washing unit.

23. The kit of according to claim 14, wherein the cleaning fabric is threaded through the slit and out of the container onto a collecting roll when the container with the roll is mounted in a washing unit.

* * * * *